United States Patent

[11] 3,629,922

[72] Inventors George T. Miller
Lewiston, N.Y.;
Arabinda N. Dey, Arlington, Mass.

[21] Appl. No. 625,310
[22] Filed Mar. 23, 1967
[45] Patented Dec. 28, 1971

[73] Assignee Hooker Chemical Corporation
Niagara Falls, N.Y.

[54] METAL PLATING OF PLASTICS
28 Claims, No Drawings

[52] U.S. Cl. .......... 29/195,
117/47 A, 117/47 R, 117/71, 117/160, 204/30
[51] Int. Cl. .......... B23p 3/00
[50] Field of Search .......... 117/47 R,
71, 138.8 B, 138.8 N, 138.8 G, 160, 47 A; 204/30;
29/195

[56] References Cited
UNITED STATES PATENTS
3,035,944 5/1962 Sher et al. .......... 117/213

*Primary Examiner*—Alfred L. Leavitt
*Assistant Examiner*—Janyce A. Bell
*Attorneys*—Peter F. Casella, Donald C. Studley, James F. Mudd, Richard P. Mueller and Edward A. Meilman

ABSTRACT: Plastics, particularly nylon, poly(haloethylene), and phenolic resins are plated with metals by pretreatment of the plastic surface with a phosphorus compound such as trihydroxymethyl phosphine in a solvent, followed by contacting the treated surface with a metal salt or complex thereof. The resulting treated surface is either conductive or is capable of catalyzing the reduction of a metal salt to produce a conductive surface. Such conductive surfaces are readily electroplated by conventional techniques.

METAL PLATING OF PLASTICS

BACKGROUND OF THE INVENTION

There is a rapidly increasing demand for metal-plated plastic articles, for example, in the production of low-cost plastic articles that have a simulated metal appearance. Such articles are in demand in such industries as automotive, home appliance, radio and television and for use in decorative containers and the like. Heretofore, the metal plating of plastics has required many process steps.

It is the object of this invention to provide a simple process for the metal plating of plastics. A further object of the invention is to provide plastic articles having an adherent metal coating that is resistant to peeling, temperature cycling, and corrosion. Such coatings are electrically conductive whereby static charges are readily dissipated from the plastic surfaces. Such conductive surfaces are useful in printing circuits. The metal coatings further serve to protect plastic articles from abrasion, scratching and marring, reduce their porosity and improve their thermal conductivity.

SUMMARY OF THE INVENTION

This invention provides a process which comprises contacting a plastic surface with a phosphorus compound wherein the phosphorus is not fully oxidized, i.e., wherein the phosphorus has a valence of less than five, such as trihydroxymethyl phosphine, to deposit the phosphorus compound at the plastic surface and thereafter contacting the thus-treated surface with a solution of a metal salt or complex thereof. In one aspect of the invention, the resultant surface is electroplated to deposit an adherent metal coating on the plastic surface. In another aspect of the invention, the treated plastic surface is subjected to electroless metal plating to deposit an electroless conductive coating on the plastic surface. Thereafter, the plastic article is electroplated so as to deposit an adherent metal coating of the desired thickness on the electroless conductive coating.

Also in accordance with the invention, there is provided a plastic article having a metal coating adherently formed at the surface of the plastic.

DESCRIPTION OF THE PREFERRED EMBODIMENTS

Typical plastics to which the process of this invention is applicable include the long chain synthetic polymeric amides containing recuring carbonamide groups as an integral part of the main polymer chain, commonly referred to as "nylon," the polymers of perhaloethylenes, such as poly(tetrafluoroethylene) and poly(monochlorotrifluoroethylene) and phenolic resins. Typical commercial polymers include "Teflon" poly(tetrafluoroethylene) and "Kel-F" poly(monochlorotrifluoroethylene).

The phenolic resins can be produced from phenol itself or the various phenols that are substituted, for example, with hydroxyl groups or with halogen atoms such as fluorine, chlorine or bromine, or with hydrocarbyl radicals, such as alkyl and alkenyl groups of one to 18 carbon atoms, alicyclic groups of five to 18 carbon atoms, and aryl or aralkyl groups of six to 18 carbon atoms. Suitable substituted phenols include the following: resorcinol, catechol, hydroquinone, para-tertiary-butylphenol, para-chlorophenol, para-bromophenol, para-fluorophenol, para-tertiary hexylphenol, para-isooctylphenol, para-phenylphenol, para-benzylpnenol, para-cyclohexylphenol, para-octadecyl-phenol, para-nonylphenol, para-beta-naththyl-phenol, para-alpha-napthyl-phenol, para-cetylphenol, para-cumyl-phenol and the corresponding ortho- and meta- substituted phenols. In the preparation of the phenol-aldehyde resins, the phenol should have at least two of the three ortho and para positions unsubstituted.

The phenol-aldehyde resins are preferably prepared from formaldehyde, which can be an aqueous solution or any of its low polymeric forms such as paraform or trioxane. The aldehydes preferably contain one to 18 carbon atoms. Suitable examples include: acetaldehyde, propionaldehyde, butyraldehyde, benzaldehyde, furfural, 2-ethylhexanal, ethylbutyraldehyde, heptaldehyde, pentaerythrose, glyoxal and chloral.

The preferred phenol-aldehyde resins are the novolac resins which are produced using a ratio of about 0.5 to about 0.9 mole of aldehyde per mole of phenol. These resins are readily cured with a methylene compound, such as hexamethylene tetramine. However, the resoles can also be employed, which are produced using a ratio of at least 1 mole of aldehyde per mole of the phenol.

The polymers of the invention can be used in the unfilled condition, or with fillers such as glass fiber, glass powder, glass beads, asbestos, talc and other mineral fillers, wood flour and other vegetable fillers, carbon in its various forms, dyes, pigments and the like.

The polymers of the invention can be in various physical forms, such as shaped articles, for example, molding, sheets, rods, and the like; fibers films and fabrics and the like.

In the first step of the preferred process of the invention, the plastic surface is treated with a solution of the phosphorus compound of the invention, which include the various impure or commercial grades of the compound.

Suitable solvents or diluents for the phosphorus compound are solvents and mixtures thereof that dissolve the phosphorus compound and which preferably swell the surface of a plastic without detrimentally affecting the surface of the plastic. Such solvents are generally mixtures of a polar solvent and a nonpolar solvent. Suitable nonpolar solvents include the halogenated hydrocarbons and halocarbons such as chloroform, carbon tetrachloride, trichloroethylene, trichloroethane, dichloropropane, ethyl dibromide, ethyl chlorobromide, and the like; aromatic hydrocarbons such as benzene, toluene, xylene, ethyl benzene, naphthalene and the like; dioxane, carbon disulfide, diethyl ether and cyclohexane. Suitable polar solvents include those polar solvents having a dipole moment greater than about 1.5 Debye units. Typical polar solvents include alcohols, phenols, dimethyl sulfoxide, dimethyl formamide, methyl acetate, ethyl acetate, ethyl chloride, ketones such as acetone, nitrobenzene and mono chlorobenzene. Typical alcohols are the aliphatic alcohols of one to 10 carbon atoms, such as methyl alcohol, ethyl alcohol, butyl alcohol, octyl alcohol, decyl alcohol and the like. Typical phenols are of the type disclosed hereinbefore.

The solution of the phosphorus compound is generally in the range from about 0.01 weight percent of phosphorus compound based on the weight of the solution up to a saturated solution. Prior to contacting the plastic with the phosphorus compound, the surface of the plastic article should be clean. The solvent generally serves to clean the surface. However, it is not necessary to subject the plastic surface to special treatment such as etching, polishing and the like. The phosphorus compound treatment is generally conducted at a temperature below the softening point of the plastic, and below the boiling point of the solvent. Generally the temperature is in the range of about 30° to 135° C., but preferably in the range of about 50° to 100° C. The contact time varies depending on the nature of the plastic, the solvent and temperature, but is generally in the range of about 1 second to 1 hour or more, preferably in the range of about 1 to 10 minutes.

As a result of the first treatment step, the phosphorus compound is deposited at the surface of the plastic. By this is meant that the phosphorus compound can be located on the surface of the plastic, embedded in the plastic surface and can be embedded beneath the surface of the plastic. The location of the phosphorus compound is somewhat dependent on the action of the solvent on the plastic surface.

Following the first treatment step, the plastic surface can be rinsed with a solvent of the nature disclosed hereinbefore, and then can be dried by merely exposing the plastic surface to the atmosphere or to nonoxidizing atmospheres such as nitrogen, carbon dioxide, and the like, or by drying the surface with radiant heaters or in a conventional oven. Drying times can vary considerably, for example, from 1 second to 30 minutes or more, preferably 5 seconds to 10 minutes, more preferably 0.5 to 2 minutes. The rinsing and drying steps are optional.

In the second treatment step of the process of the invention, the phosphorus compound-treated plastic surface is contacted with a solution of a metal salt or a complex of a metal salt. The metals generally employed are those of Groups IB, IIB, IVB, VB, VIB, VIIB and VIII of the Periodic Table. The preferred metals are copper, silver, gold, chromium, manganese, cobalt, nickel, palladium, titanium, zirconium, vanadium, tantalum, cadmium, tungsten, molybdenum, and the like.

The metal salts that are used in the invention can contain a wide variety of anions. Suitable anions include the anions of mineral acids such as sulfate, chloride, bromide, iodide, fluoride, nitrate, phosphate, chlorate, perchlorate, borate, carbonate, cyanide, and the like. Also useful are the anions of organic acids such as formate, acetate, citrate, butyrate, valerate, caproate, heptylate, caprylate, naphthenate, 2-ethyl caproate, cinnamate, stearate, oleate, palmitate, dimethylglyoxime, and the like. Generally the anions of organic acids contain one to 18 carbon atoms.

Some useful metal salts include copper sulfate, copper chloride, silver nitrate and nickel cyanide.

The metal salts can be complexed with a complexing agent that produces a solution having a basic pH (>7). Particularly useful are the ammoniacal complexes of the metal salts, in which 1 to 6 ammonia molecules are complexed with the foregoing metal salts. Typical examples include $NiSO_4 \cdot 6NH_3$, $NiCl_2 \cdot 6NH_3$, $Ni(C_2H_3OO)_2 \cdot 6NH_3$, $CuSO_4 \cdot 6NH_3$, $CuCl_2 \cdot 6NH_3$, $AgNO_3 \cdot 6NH_3$, $NiSO_4 \cdot 3NH_3$, $CuSO_4 \cdot 4NH_3$, $Ni(NO_3)_2 \cdot 4NH_3$, and the like. Other useful complexing agents include quinoline, amines and puridine. Useful complexes include compounds of the formula $MX_2Q_2$ wherein M is the metal ion, X is chlorine or bromine and Q is quinoline. Typical examples include: $CoCl_2Q_2$, $CoBr_2Q_2$, $NiCl_2Q_2$, $NiBr_2Q_2$, $NiI_2Q_2$, $MnCl_2Q_2$, $CuCl_2Q_2$, $CuBr_2Q_2$ and $ZnCl_2Q_2$. Also useful are the corresponding monoquinoline complexes such as $CoCl_2Q$. Useful amine complexes include the mono-(ethylenediamine)-, bis(ethylenediamine)-, tris(ethylenediamine)-, bis-(1,2-propanediamine)-, and bis(1,3-propanediamine)-complexes of salts such as copper sulfate. Typical pyridine complexes include $NiCl_2(py)_2$ and $CuCl_2(py)_2$ where py is pyridine.

The foregoing metal salts and their complexes are used in ionic media, preferably in aqueous solutions. However, nonaqueous media can be employed such as alcohols, for example, methyl alcohol, ethyl alcohol, butyl alcohol, heptyl alcohol, decyl alcohol, and the like. Mixtures of alcohol and water can be used. Also, useful are mixtures of alcohol with other miscible solvents of the types disclosed hereinbefore. The solution concentration is generally in the range from about 0.1 weight percent metal salt or complex based on the total weight of the solution up to a saturated solution, preferably from about 1 to about 10 weight percent metal salt or complex. The pH of the metal salt or complex solution is generally maintained in the range from about 7 to 14, more preferably from about 10 to about 13.

The step of contacting the phosphorus compound-treated plastic surface with the solution of metal salt is generally conducted at a temperature below the softening point of the plastic, and below the boiling point of the solvent, if one is used. Generally the temperature is in the range of about 30° to 110° C., preferably from about 50° to 100° C. The time of contact can vary considerably, depending on the nature of the plastic, the characteristics of the metal salts employed and the contact temperature. However, the time of contact is generally in the range of about 0.1 to 30 minutes, preferably about 5 to 10 minutes.

Depending on the conditions employed in the two treatment steps, the duration of the treatments, and the nature of the plastic treated, the resulting treated plastic surface may be either (1) conductive, such that the surface can be readily electroplated by conventional techniques, or (2) nonconductive. In the latter instance the treated surface contains active or catalytic sites that render the surface susceptible to further treatment by electroless plating processes that produce a conductive coating on the plastic surface. Such a conductive coating is then capable of being plated by conventional electrolytic processes.

The treated plastic surfaces that result from contacting the phosphorus compound-treated surface with a metal salt solution can be subjected to a process that has become known in the art as electroless plating or chemical plating. In a typical electroless plating process, a catalytic plastic surface is contacted with a solution of a metal salt under conditions in which the metallic ion of the metal salt is reduced to the metallic state and deposited on the catalytic plastic surface. The use of this process with the plastic products of this invention relies upon the catalytic metal sites deposited on the plastic surface as a result of the treatment with the solution of metal salt or complex of this invention. A suitable chemical-treating bath for the deposition of a nickel coating on the catalytic plastic surface produced in accordance with the process of the invention can comprise, for example, a solution of a nickel salt in an aqueous hypophosphite solution. Suitable hypophosphites include the alkali metal hypophosphites such as sodium hypophosphite and potassium hypophosphite, and the alkaline earth metal hypophosphites such as calcium hypophosphite and barium hypophosphite. Other suitable metal salts for use in the chemical-treating bath include the metal salts described hereinbefore with respect to the metal salt treatment of the phosphorus-treated plastic surface of the invention. Other reducing media include formaldehyde, hydroquinone and hydrazine. Other agents, such as buffering agents, complexing agents, and other additives are included in the chemical-plating solutions or baths.

The treated plastic surfaces of the invention that are conductive can be electroplated by the processes known in the art. The plastic article is generally used as the cathode. The metal desired to be plated is generally dissolved in an aqueous-plating bath, although other media can be employed. Generally, a soluble metal anode of the metal to be plated can be employed. In some instances, however, a carbon anode or other inert anode is used. Suitable metals, solutions and condition for electroplating are described in Metal Finishing Guidebook Directory for 1967, published by Metals and Plastics Publications, Inc., Westwood, N. J.

The following examples serve to illustrate the invention but are not intended to limit it. Unless specified otherwise, all temperatures are in degrees Centigrade and parts are understood to be expressed in parts by weight.

EXAMPLE 1

A nylon rod measuring three-eighths of an inch in diameter was contacted with a solution comprised of trihydroxymethyl phosphine dissolved in a mixture of 1 part by volume of benzene and 1 part by volume of ethyl alcohol, for about 1 minute. The nylon rod was then dried in the atmosphere, and thereafter introduced to a saturated, ammoniacal solution of silver nitrate for 5 minutes at 60° C. A brown coating of nonconductive silver was deposited on the nylon rod. The rod was then subjected to the last three steps of the electroless nickel plating MACuplex process of the Mac Dermid Company, which produced a bright, shiny nickel coating on the nylon rod. The nylon rod was then electroplated using the conventional Watts nickel plating process. A peel strength of 3 to 4 pounds per inch was determined for the nickel plate. (The peel strength as defined in this specification is that force in pounds required to pull an inch wide strip of metal away from the plastic surface).

EXAMPLE 2

An article made of poly(monochlorotrifluoroethylene) was subjected to the same process steps as described in example 1. A bright, shiny nickel coating was deposited on the plastic article.

EXAMPLE 3

A nylon article was first contacted with a solution of trihydroxy-methylphosphine dissolved in a mixture of 1 part by volume of benzene and 1 part by volume of ethyl alcohol for about 1 minute. The sample was then dried and subjected to the last three steps of the electroless nickel plating MACuplex process of the Mac Dermid Company. A bright nickel plate was deposited on the nylon article. The plastic article was then electroplated using the conventional Watts nickel plating process to produce an adherent nickel coating.

EXAMPLE 4

An article made of poly(monochlorotrifluoroethylene) was treated in accordance with the process of example 3. An adherent, shiny nickel plate was obtained.

EXAMPLE 5

A nylon article was first contacted with concentrated nitric acid for 0.5 minute, and was thereafter subjected to the process set forth in example 1. An adherent nickel plate was obtained on the nylon article.

EXAMPLE 6

A nylon article was pretreated by contacting the article with concentrated nitric acid for 0.5 minute. Thereafter the nylon article was subjected to the process set forth in example 3. An adherent nickel plate was obtained on the plastic article.

EXAMPLE 7

A bottle cap molded from a phenol-formaldehyde novolac resin and cross-linked with hexamethylene tetramine was subjected to the process described in example 1. A nickel coating was deposited on the phenolic resin article.

EXAMPLE 8

A nylon-filled, molded article of a phenolformaldehyde novolac resin cross-linked with hexamethylene tetramine was abraded and then contacted with a solution of trihydroxymethyl phosphine in a mixture of 1 part by volume of benzene and 1 part by volume of ethyl alcohol for 2 minutes at 60° C. The treated article was then contacted with an ammoniacal solution of silver nitrate for 5 minutes at 60° C. The resulting treated article was then subjected to the last three steps of the electroless nickel plating MACuplex process of the Mac Dermid Company. The resulting nickel-coated article was then electroplated with copper at a current density of 50 amperes per square foot for 35 minutes, and then was electroplated with nickel at a current density of 50 amperes per square foot for 5 minutes. The resulting metal plate had a peel strength of 3 pounds per inch.

Various changes and modifications can be made in the process and products of this invention without departing from the spirit and scope of the invention. The various embodiments of the invention disclosed herein serve to further illustrate the invention but are not intended to limit it.

We claim:

1. A process which comprises contacting a polymer with a solution of trihydroxymethyl phosphine, and thereafter contacting the resulting treated polymer with a solution of a metal salt or complex thereof, wherein said polymer is a long chain synthetic polymeric amide containing recurring carbonamide groups as an integral part of the main polymer chain, a poly(haloethylene) or a phenolic resin and wherein said metal is selected from the Groups IB, IIB, IVB, VB, VIB, VIIB and VIII of the Periodic Table.

2. The process of claim 1 wherein the trihydroxymethyl phosphine is dissolved in a mixture of polar and nonpolar solvents.

3. The process of claim 2 wherein the trihydroxymethyl phosphine is dissolved in a mixture of benzene and ethyl alcohol.

4. The process of claim 2 wherein the metal salt complex is an ammoniacal complex of silver nitrate.

5. The process wherein a treated polymer surface resulting from the process of claim 1 is subjected to electroless metal plating to deposit an electroless conductive coating on the treated polymer surface.

6. A process which comprises contacting a polymer with a solution of trihydroxymethyl phosphine, and thereafter subjecting the treated surface to an electroless metal plating process to deposit an electroless conductive coating on the treated polymer surface, wherein said polymer is a long chain synthetic polymeric amide containing recurring carbonamide groups as an integral part of the main polymer chain, a poly(haloethylene) or a phenolic resin.

7. The process of claim 6 wherein the trihydroxymethyl phosphine is dissolved in a mixture of polar and nonpolar solvents.

8. The process of claim 7 wherein the trihydroxymethyl phosphine is dissolved in a mixture of benzene and methyl alcohol.

9. The process of claim 1 wherein the polymer is contacted with nitric acid prior to the step of contacting the polymer surface with the phosphorus compound.

10. A process wherein a treated polymer surface resulting from the process of claim 1 is electroplated to deposit an adherent metal coating on the treated polymer surface.

11. A process wherein a coated polymer surface resulting from the process of claim 5 is electroplated to deposit an adherent metal coating on the coated polymer surface.

12. A process wherein a coated polymer surface resulting from the process of claim 6 is electroplated to deposit an adherent metal coating on the coated polymer surface.

13. A polymer article having a treated surface produced by a process which comprises contacting said article with a solution of trihydroxymethyl phosphine, and thereafter contacting the resulting treated article with a solution of a metal salt or complex thereof, wherein said metal is selected from Groups IB, IIB, IVB, VB, VIB, VIIB and VIII of the Periodic Table, wherein said polymer is a long chain synthetic polymeric amide containing recurring carbonamide groups as an integral part of the main polymer chain, a poly(haloethylene) or a phenolic resin.

14. The polymer article of claim 13 having an adherent electroless conductive coating deposited on the treated surface of the article.

15. The article of claim 13 wherein the polymer is a long chain synthetic polymeric amide containing recurring carbonamide groups as an integral part of the main polymer chain.

16. The article of claim 13 wherein the polymer is a poly(haloethylene).

17. The article of claim 16 wherein the poly(haloethylene) is poly(monochlorotrifluoroethylene).

18. The article of claim 13 wherein the polymer is a phenolic resin.

19. The article of claim 18 wherein the phenolic resin is a phenolformaldehyde resin.

20. A polymer article having an adherent metallic coating produced by a process which comprises contacting said article with a solution of trihydroxymethyl phosphine, and thereafter subjecting the treated polymer surface to an electroless metal plating process to deposit an electroless conductive coating on the treated polymer surface, wherein said polymer is a long chain synthetic polymeric amide containing recurring carbonamide groups as an integral part of the main polymer chain, a poly(haloethylene) or a phenolic resin.

21. The article of claim 20 wherein the polymer is a long chain synthetic polymeric amide containing recurring carbonamide groups as an integral part of the main polymer chain.

22. The article of claim 20 wherein the polymer is a poly(haloethylene).

23. The article of claim 22 wherein the poly(haloethylene) is poly(monochlorotrifluoroethylene).

24. The article of claim 20 wherein the polymer is a phenolic resin.

25. The article of claim 24 wherein the phenolic resin is a phenolformaldehyde resin.

26. The article of claim 13 having an adherent metal coating electrolytically deposited on the treated surface.

27. The article of claim 14 having an adherent metal coating electrolytically deposited on the electroless conductive coating.

28. The article of claim 20 having an adherent metal coating electrolytically deposited on the electroless conductive coating.

* * * * *